R. J. THOMAS.
WATER-CLOSET VALVES.
No. 189,908. Patented April 24, 1877.
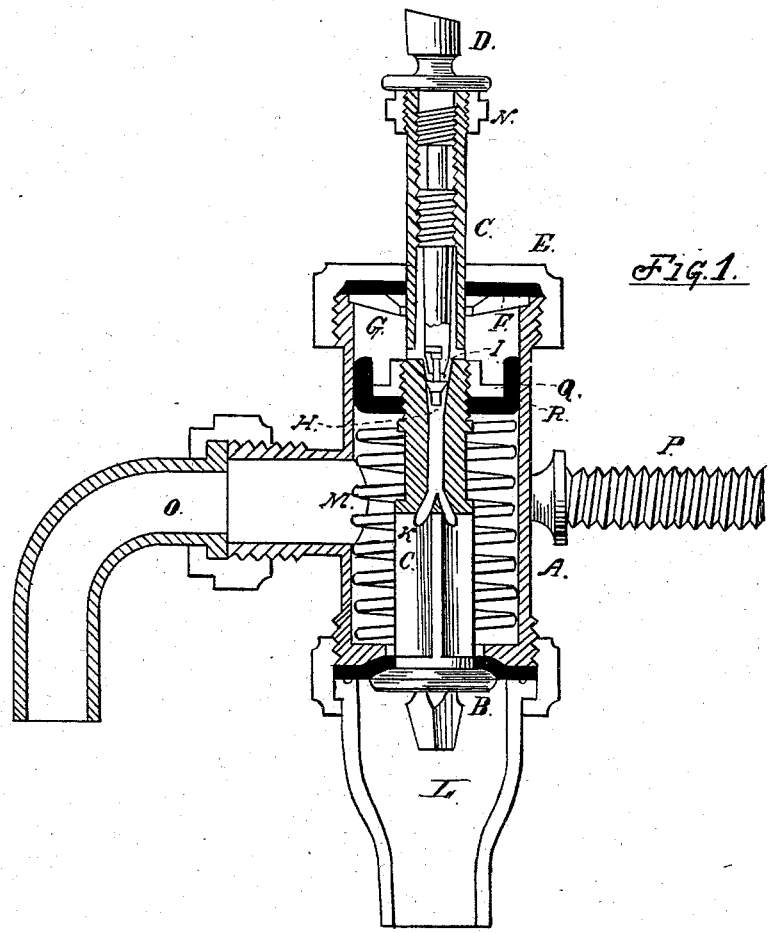

UNITED STATES PATENT OFFICE.

RICHARD J. THOMAS, OF MILWAUKEE, WISCONSIN.

IMPROVEMENT IN WATER-CLOSET VALVES.

Specification forming part of Letters Patent No. 189,908, dated April 24, 1877; application filed September 9, 1876.

*To all whom it may concern:*

Be it known that I, RICHARD J. THOMAS, of Milwaukee, in the county of Milwaukee, in the State of Wisconsin, have invented certain Improvements in Water - Closet Cocks, of which the following is a specification:

My invention has for its object regulating the flow of water to a water-closet, and is a cock with a valve which the water presses against and closes; and to supply water to a closet, a lever, when pulled on, presses back a stem attached to the valve and opens it and lets the water through, and a small valve above a packed piston-head is regulated so as to let water pass the piston-head, which water passes through openings in the stem, and the piston-head holds the water and prevents the supply-valve from closing too suddenly. The water above the piston-head is allowed to fall back fast or slow, as may be desired, by the regulation of the small valve.

Figure 1 is a longitudinal sectional view of my invention.

A is the outside cylinder; B, the valve, which permits the water to pass to the water-closet; C, the valve-stem, the upper part of which is hollow; D, a regulator, which screws into the hollow part of the stem C; E, a cap screwed on over the end of cylinder A; F, packing under cap E; G, a metal piece under the packing; H, a small valve hung on the end of regulator D; I, valve-seat for small valve H; K, a hole through the valve-stem, which conveys water from one side to the other of the piston-head; L, a coupling held to the end of the cylinder A by means of a nut, and through which water is conveyed to the passage O; M, a spiral spring, which holds the valve B closed; N, a head screwed on to the end of valve-stem C; O, outlet for water; P, a bolt to hold the cock in position; Q, piston-head in the cylinder A, with packing around same; R, rubber packing under piston-head Q.

The operation of this cock is as follows: Press on valve-stem C, and that will open valve B, and the water will pass through and out of the opening O. Some of the water will pass through openings K, and by the valve-seat I the valve H will be pressed back, the stem of same passing into the end of regulator D, and upon the pressure being removed from valve-stem C the water on the upper side of piston-head Q will not let the valve B close until the water passes back by the valve-seat I and through openings K, the regulator being adjusted so as to hold the valve H from the seat far enough to allow the water to pass off slowly, so that the valve B shall remain open long enough to have a supply of water pass, as may be wanted.

I claim as new, and as my invention—

1. The combination of hollow valve-stem C, valve-regulator D, screwed into valve-stem C, and projecting out of the cock so that the valve may be adjusted without opening the cock, valve H, the stem of which slides into the adjuster D, and valve-seat I, substantially as described.

2. Valve-stem C, valve B, piston-head Q, openings K, adjuster D, and valve H, in combination with case A and valve-seat I, substantially as described.

RICHARD J. THOMAS.

Witnesses:
   J. B. SMITH,
   S. G. KING.